(12) United States Patent
Hudis et al.

(10) Patent No.: US 7,457,826 B2
(45) Date of Patent: Nov. 25, 2008

(54) SYSTEMS AND METHODS FOR SYNCHRONIZATION OF ITEMS WITHOUT SNAPSHOTS

(75) Inventors: Irena Hudis, Bellevue, WA (US); Lev Novik, Bellevue, WA (US); Rajesh M. Rao, Sammamish, WA (US); Sameet H. Agarwal, Redmond, WA (US); Vivek Jawahir Jhaveri, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/025,165

(22) Filed: Dec. 20, 2004

(65) Prior Publication Data

US 2006/0136418 A1  Jun. 22, 2006

(51) Int. Cl.
*G06F 17/30* (2006.01)
(52) U.S. Cl. ............................ 707/200; 707/1; 707/102; 709/249; 711/100; 711/200
(58) Field of Classification Search .................. 707/1, 707/200, 102; 711/100, 200; 709/249
See application file for complete search history.

(56) References Cited

U.S. PATENT DOCUMENTS

| | | | | |
|---|---|---|---|---|
| 5,506,983 | A | * | 4/1996 | Atkinson et al. ................ 707/1 |
| 5,758,347 | A | * | 5/1998 | Lo et al. .................. 707/103 R |
| 5,893,106 | A | | 4/1999 | Brobst et al. ................. 707/102 |
| 5,900,870 | A | | 5/1999 | Malone et al. ............... 345/333 |
| 6,047,291 | A | | 4/2000 | Anderson et al. ............ 707/103 |
| 6,085,192 | A | | 7/2000 | Mendez et al. ................. 707/10 |
| 6,108,004 | A | | 8/2000 | Medl ............................ 345/346 |
| 6,112,024 | A | | 8/2000 | Almond et al. .............. 395/703 |
| 6,151,606 | A | | 11/2000 | Mendez ....................... 707/201 |
| 6,199,195 | B1 | | 3/2001 | Goodwin et al. ................ 717/1 |
| 6,298,425 | B1 | * | 10/2001 | Whitaker et al. ............. 711/162 |
| 6,338,056 | B1 | | 1/2002 | Dessloch et al. ................ 707/2 |
| 6,370,541 | B1 | | 4/2002 | Chou et al. .................. 707/103 |
| 6,519,597 | B1 | | 2/2003 | Cheng et al. ................... 707/10 |
| 6,556,983 | B1 | | 4/2003 | Altschuler et al. ............. 706/55 |

(Continued)

FOREIGN PATENT DOCUMENTS

WO  WO 02/075539 A2  9/2002

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner*—Hosain T Alam
*Assistant Examiner*—Syling Yen
(74) *Attorney, Agent, or Firm*—Woodcock Washburn LLP

(57) ABSTRACT

Various embodiments of the present invention are directed to systems and methods for synchronizing mixed elements (MEs) comprising structure data and unstructured filestreams between peer computer systems in a hardware/software interface system environment that does not permit snapshotting of large unstructured ME filestreams during synchronization. For several such embodiments, the method comprises synchronizing the ME in two steps, one for snapshotting the structured data component of the ME (as well as the cv of the filestream but not the filestream itself) and one for locking and transmitting the filestream to the receiving sync peer if and only if, after being locked, it is determined that the filestream is unchanged from the time of the ME data component snapshot.

13 Claims, 3 Drawing Sheets

U.S. PATENT DOCUMENTS

| | | | |
|---|---|---|---|
| 6,578,046 B2 | 6/2003 | Chang et al. | 707/103 |
| 6,708,221 B1 | 3/2004 | Mendez et al. | 709/248 |
| 6,983,296 B1* | 1/2006 | Muhlestein et al. | 707/206 |
| 7,103,796 B1* | 9/2006 | Kekre et al. | 714/6 |
| 7,162,486 B2* | 1/2007 | Patel et al. | 707/102 |
| 2002/0091702 A1 | 7/2002 | Mullins | 707/100 |
| 2002/0103818 A1* | 8/2002 | Amberden | 707/205 |
| 2002/0198891 A1 | 12/2002 | Li et al. | 707/102 |
| 2004/0255048 A1* | 12/2004 | Lev Ran et al. | 709/249 |
| 2004/0267836 A1* | 12/2004 | Armangau et al. | 707/203 |
| 2005/0246389 A1* | 11/2005 | Shah et al. | 707/200 |
| 2005/0251633 A1* | 11/2005 | Micka et al. | 711/162 |
| 2005/0278380 A1* | 12/2005 | Ferris | 707/104.1 |

OTHER PUBLICATIONS

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems G.M. Nijssen, (ed)*; North Holland Publishing Company. 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serilization in Java 1.1. Making Objects Persistent, *WEB Techniques*, 1997, 2(9), 55, 58-59.

"Developer's Guide to Apple Data Detectors-For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assets to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al. "Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop On Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

Kiesling, R., "ODBC in UNIX Environments", *Dr. Dobb's Journal*, Dec. 2002, 27(12), 16-22.

King et ai, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mallet, S. et al., "Myrtle: A Set-Oriented Meta-Interpreter Driven by a Relational Trace for Deductive Databases Debugging", *Lecture Notes in Computer Science*, 1999, 1559, 328-330.

Mariani, J. A., Oggetto: "An Object Oriented Database Layered on a Triple Store", *The Computer Journal*, 1992, 35(2), 108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2), 403-412.

Ottogalli, F.G. et al., "Visualisation of Distributed Applications for Performance Debugging", *Lecture Notes in Computer Science*, Jan. 2001, 2074, 831-840.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectural Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Mazzola Paluska, J. et al., "Footloose: A Case for Physical Eventual Consistency and Selective Conflict Resolution", *Proceedings of the $5^{th}$ IEEE Workshop on Mobile Computing Systems and Applications*, 2003, 170-179.

Huang, Yun-Wu. Et al., "Lightweight Version Vectors for Pervasive Computing Devices", *IEEE*, 2000, 43-48.

Ramsey, N. et al., "An Algebraic Approach to File Synchronization", *Software Engineering Notes, Association for Computing Machinery*, Sep. 2001, 26(5), 175-185, XP002295139.

Gray, J. et al., "The Dangers of replication and a Solution", *SIGMOD*, 1996, 25(2), 173-182, XP-002146555.

Helal, S. et al., "A Three-tier Architecture for Ubiquitous Data Access", *Computer Systems and Applications ACS/IEEE*, Jun. 2001, 177-180, XP010551207.

Kistler, J.J. et al., "Disconnected Operation in the Coda File System", *ACM Transactions on Computer Systems*, Feb. 1992, 10(1), 3-25, XP000323223.

Kistler, J.J. et al., "Increasing File System Availability through Second-Class Replication", *IEEE*, 1990, 65-69, XP010021244.

"SyncML Sync Protocol", 2000, Version 1.0, 60 pages, http://www.syncml.org/docs/syncml_protocol_v10_20001.207.pdf.

Seshadri, P. et al., "SQLServer for Windows Ce-a Database Engine for Mobile and Embedded Platforms", *Data Engineering, Proceedings of the $16^{th}$ International Conference, IEEE Computer Society*, Mar. 2000, 642-644, XP 010378761.

Berenson, H. "A Critique of ANSI SQL Isolation Levels", *SIGMOD Record*, 1995, 24(2), 10 pages.

Greenwald, R. et al., "Oracle Essentials: Oracle 8 & Oracle 8i", *MultiUser Concurrency*, 1999, Ch. 7, 7 pages, XP-002312028.

Plattner, C. et al., "Ganymed: Scalable Replication for Transactional Web Applications", *IFIP International federation for Information Processing*, 2004, 155-174, XP-002370197.

Shapiro, M. et al., "Managing Databases with Binary Large Objects", *IEEE*, 1999, 185-193, XP-000922048.

* cited by examiner

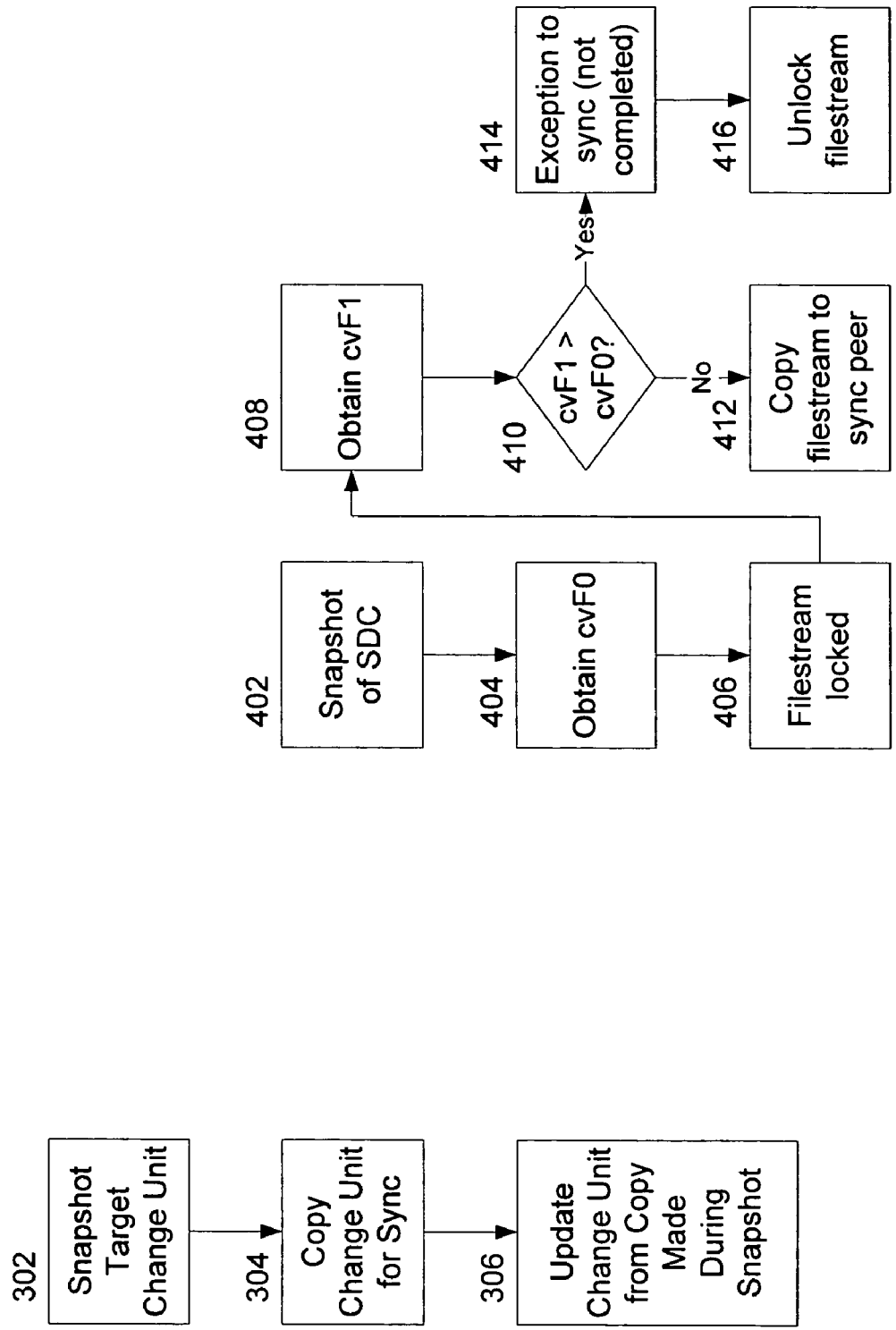

“SYSTEMS AND METHODS FOR SYNCHRONIZATION OF ITEMS WITHOUT SNAPSHOTS”

CROSS-REFERENCE TO RELATED APPLICATIONS

This application is related by subject matter to the inventions disclosed in the following commonly assigned applications, the contents of which are hereby incorporated by reference into this present application in their entirety: U.S. patent application Ser. No. 10/403,781, filed Mar. 31, 2003, entitled "GHOSTED SYNCHRONIZATION"; U.S. patent application Ser. No. 11/063,424, filed on Feb. 22, 2005, entitled "SYNCHRONIZATION WITH DERIVED METADATA"; U.S. patent application Ser. No. 10/932,474, filed Sep. 1, 2004, entitled "SYSTEMS AND METHODS FOR THE PROPOGATION OF CONFLICT RESOLUTION TO ENFORCE ITEM CONVERGENCE (I.E., DATA CONVERGENCE)"; which in turn claims benefit of U.S. Provisional Application No. 60/558,338, filed Apr. 1, 2004, entitled "SYSTEMS AND METHODS FOR THE PROPOGATION OF CONFLICT RESOLUTION TO ENFORCE ITEM CONVERGENCE (I.E., DATA CONVERGENCE)"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM." U.S. patent application Ser. No. 10/646,646, filed on Aug. 21, 2003, entitled "STORAGE PLATFORM FOR ORGANIZING, SEARCHING, AND SHARING DATA"; U.S. patent application Ser. No. 10/692,515, filed on Oct. 24, 2003, entitled "SYSTEMS AND METHODS FOR PROVIDING SYNCHRONIZATION SERVICES FOR UNITS OF INFORMATION MANAGEABLE BY A HARDWARE/SOFTWARE INTERFACE SYSTEM"; U.S. patent application Ser. No. 10/692,508, filed on Oct. 24, 2003, entitled "SYSTEMS AND METHODS FOR PROVIDING RELATIONAL AND HIERARCHICAL SYNCHRONIZATION SERVICES FOR UNITS OF INFORMATION MANAGEABLE BY A HARDWARE/SOFTWARE INTERFACE SYSTEM"; U.S. patent application Ser. No. 10/693,362, filed on Oct. 24, 2003, entitled "SYSTEMS AND METHODS FOR THE IMPLEMENTATION OF A SYNCHRONIZATION SCHEMAS FOR UNITS OF INFORMATION MANAGEABLE BY A HARDWARE/SOFTWARE INTERFACE SYSTEM"; and U.S. patent application Ser. No. 10/883,621, filed on Jun. 30, 2004, entitled "SYSTEMS AND METHODS FOR PROVIDING CONFLICT HANDLING FOR PEER-TO-PEER SYNCHRONIZATION OF UNITS OF INFORMATION MANAGEABLE BY A HARDWARE/SOFTWARE INTERFACE SYSTEM"; and the U.S. Patent Applications cited and/or cross-referenced therein (altogether hereinafter collectively referred to as the "Foundational Patent Applications").

FIELD OF THE INVENTION

The present invention relates generally to the synchronization of data across computer systems and, more particularly, to synchronizing mixed elements (MEs), comprising structure data and unstructured filestreams, between peer computer systems in a hardware/software interface system environment that does not permit snapshotting of large unstructured ME filestreams during synchronization.

BACKGROUND OF THE INVENTION

A peer-to-peer synchronization environment and its underlying hardware/software interface system is disclosed in detail in the Foundational Patent Applications recited earlier herein. In summary, the Foundational Patent Applications describe a hardware/software interface system (such as, but not limited to, an operating system) where, among other things, autonomous units of storable information (Items) comprise several component change units (CUs) that constitute the basic data change element for synchronization. Each CU has associated metadata that enables the synchronization system to track what changes need to be updated on peer computer systems as well as what changes received from other peer computer systems should be applied.

For certain hardware/software interface systems, including the one described in the Foundational Patent Applications, certain of the autonomous units of storable information (e.g., an Item) may be of two kinds: structured or mixed. A structured element (SE) solely comprises richly-structured data, whereas a mixed element (ME) comprises both richly-structure data and an unstructured filestream. With regard to synchronization, an SE meets certain size restrictions and is easily synchronized because it is small enough to create copies as needed. However, an ME is typically used for data structures that exceed the normal limits for Items and, because of their size, cannot be so easily copied.

For certain hardware/software interface systems, including the one described in the Foundational Patent Applications, synchronization of Items is typically performed at a transaction isolation level (TIL) that allows the target Item to be copied during synchronization. Specifically, the target item is "snapshotted" such that while it is being copied to a synchronization peer it cannot be written to by another process; instead, a copy of the target Item is made and modified by the other process, and this copy then overwrites the original once the synchronization of said target Item is complete. This as-needed copying essentially allows the synchronization system to prevent the target item from being changed while it is being copied to the synchronization peer (and thus provides a complete "snapshot" that remains unchanged during the operation of the synchronization process) while allowing other processes to make changes to a copy of the targeted Item that eventually replaces the targeted Item once the synchronization of said target Item is complete. This particular TIL can be referred to as a snapshot TIL (STIL).

However, while an SE can be synchronized using snapshot TIL, it is often the case that snapshots are not made for an ME's filestream because of the size of the filestream itself and the undesirability of creating even a temporary copy of very large data objects. Therefore, what is needed in the art is a system and method for synchronizing MEs and, specifically, for synchronizing the filestream component of MEs between peer computer systems in a hardware/software interface system environment that does not permit snapshotting of large unstructured ME filestreams during synchronization.

SUMMARY OF THE INVENTION

Various embodiments of the present invention are directed to systems and methods for synchronizing MEs (and, specifically, for synchronizing the filestream component of MEs) between peer computer systems in a hardware/software interface system environment that does not permit snapshotting of large unstructured ME filestreams during synchronization. For several such embodiments, the method comprises synchronizing the ME in two steps, one for snapshotting the structured data component of the ME (as well as the cv of the filestream but not the filestream itself) and one for locking and transmitting the filestream to the receiving sync peer if and only if, after being locked, it is determined that the filestream is unchanged from the time of the ME data component snapshot.

During synchronization, the structure data component of the ME is synchronized using the snapshot TLI, and the corresponding filestreams current version (cvF) at the time this snapshot is taken is stored as a first value (cvF0). (The filestream of an ME comprises its own change unit and thus has its own change version). Then, when the filestream is ready to be copied during synchronization (if necessary based on the synchronization requirements), the filestream itself is locked (to prevent another process from changing the filestream) and, before being copied, the cvF is again checked again to determine a second value (cvF1) to compare against the first value (cvF0). If the values are the same (indicating that the filestream is unchanged), the filestream is copied to the sync peer. On the other hand, if cvF1 is not the same as cvF0, then this indicates that the filestream has been updated since the ME's structure data was snapshotted, in which case the filestream is not copied and the change unit for the filestream reflects an "exception" to the synchronization, that is, that a failure to synchronize occurred and which is noted by the receiving sync peer and, in due course, leads to a subsequent attempt to synchronize the ME during the next synchronization operation between the two peers.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a process flow diagram illustrating the method used in conjunction with several embodiments of the present invention to synchronize an SE (and, as discussed later herein, the structured portion of an ME); and FIG. 4 is a process flow diagram illustrating the steps of the method for synchronizing an ME that is representative of the methodology utilized for several embodiments of the present invention.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
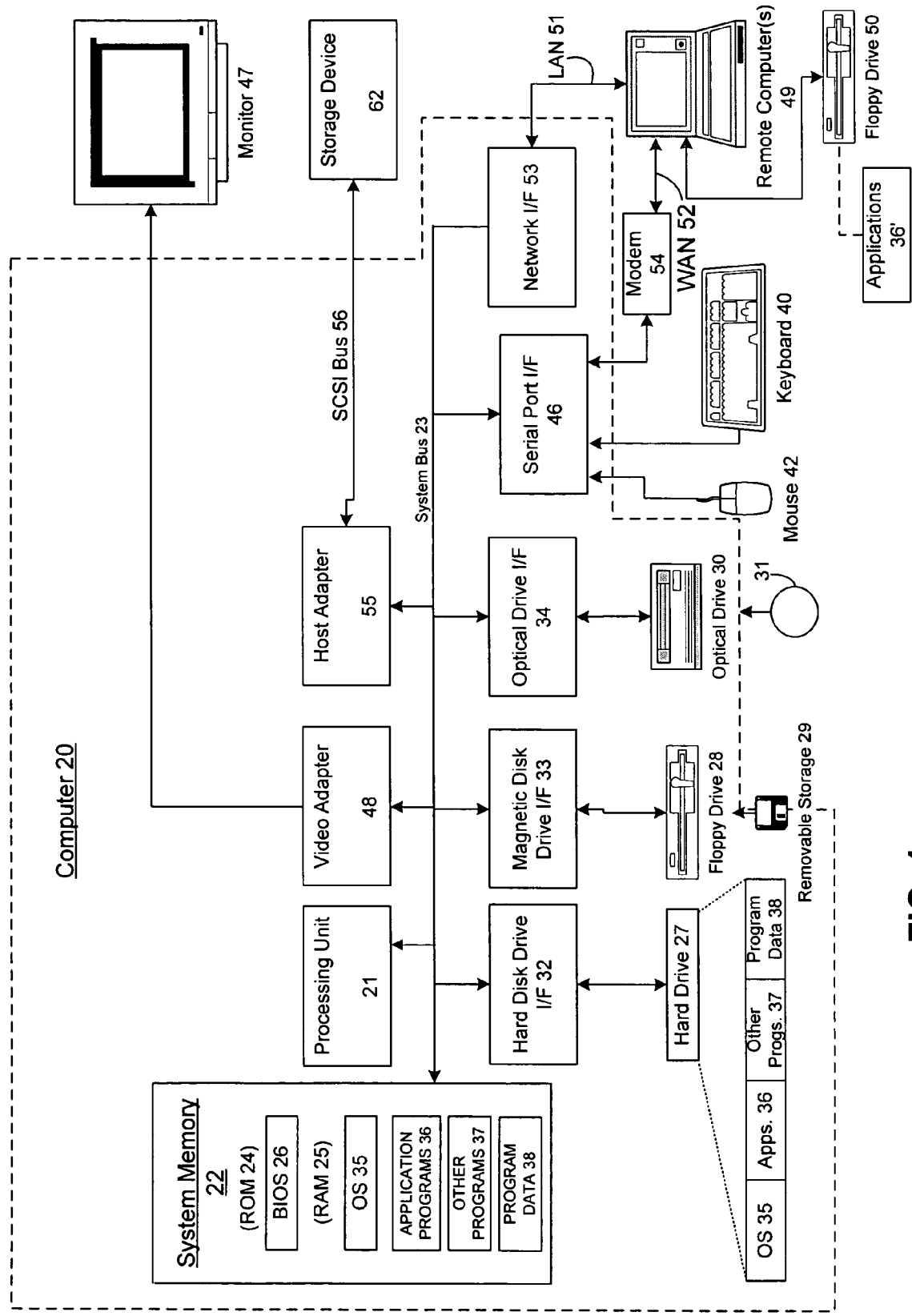
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38.

A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Basic Synchronization

A peer-to-peer synchronization environment and its underlying hardware/software interface system is disclosed in detail in the Foundational Patent Applications recited earlier herein. In summary, the Foundational Patent Applications describe a hardware/software interface system (such as, but not limited to, an operating system) where, among other things, autonomous units of storable information (Items) comprise several component change units (CUs) that constitute the basic data change element for synchronization. Each CU has associated metadata that enables the synchronization system to track what changes need to be updated on peer computer systems as well as what changes received from other peer computer systems should be applied.

A CU is essentially a set of properties that are always synchronized as a unit. For example, the First Name and Last Name properties of a Contact Item may together comprise a single change unit. In addition, a "version" is associated with each change unit to represent the last partner to made a particular change to that change unit along with a timestamp corresponding to when the update was made. Thus, as used herein, and for simplicity of notation, partners are represented by letters and versions are represented by increasing integer numbers such that, by simply pairing the partner (e.g., "A") and a timestamp (e.g., "1"), each change unit has associated with it a unique identification numbers reflecting the latest changes made by each partner at a specific time-e.g., "A1".

One exemplary form of basic synchronization for systems using change units and metadata for synchronization (or similar structures) can be generally described in terms of a single change unit for an item that exists on two peer computer systems. In regard to this single change unit, a first peer, Partner A (or, more simply, "A"), requests changes from a second peer, Partner B (or, more simply, "B"), by transmitting to B its current metadata (Ma) pertaining to its replica of the change unit (CUa). Partner B, upon receiving Ma (corresponding to CUa), compares this metadata with its own metadata (Mb) for its replica of the same change unit (CUb). Then, if Mb reflects any changes to CUb that are not reflected in Ma, B transmits both CUb and Mb to A; otherwise B only transmits its Mb to A (or, alternately, transmits a "no updates" indicator to A) since CUa already reflects all updates made to CUb and thus copying CUb from B to A is unnecessary.

Based on B's response to its sync request, if A receives only Mb back from B (or, alternately, a "no update" indicator) but no CUb then A knows that CUa is either the same as or more updated than CUb. However, if A receives both Mb and CUb back from B, then A must then determine, by a comparison of Ma to Mb, whether CUb is more updated than CUa or whether CUa and CUb have conflicting changes. If CUb is more updated than CUa, A then updates CUa with CUb and A also updates Ma with Mb. On the other hand, if CUa and CUb have conflicting changes, then A resolves that conflict according to its local conflict resolution procedures. For example, if A's conflict resolution procedure in this case is to choose a local solution over a remote solution, the A would continue to retain CUa (rejecting CUb's changes) and update Ma to include all updates already reflection Ma and Mb (the union of Ma and Mb). Thereafter, when B then syncs with A using the same procedure (and presuming no intervening additional changes), it will conclude that CUa is more updated that CUb and update CUb with CUa.

For this basic synchronization schema, the metadata for each change unit comprises two components: a current version (cv) indicating the current "update" status of the change unit, as well as an awareness vector (av) (a.k.a. an "array of versions") corresponding to the updates that have occurred to said change unit for each partner in the peer community (or at least those partners that have made any changes). A typical format for change unit metadata is <change version, awareness vector> or, more simply, <cv, [av]>. Together this information can be used to readily determine that, for example, a change unit on partner A (CUa) having metadata (Ma) of <A13, [A13, B11]> is more updated than a change unit on partner B (CUb) having metadata (Mb) of <B11, [A12, B11]> because Ma includes changes (namely A13) that are not reflected in Mb given that the timestamp portion of each version number is incrementally increasing with time.

Snapshots and Filestreams

Figure 2B:
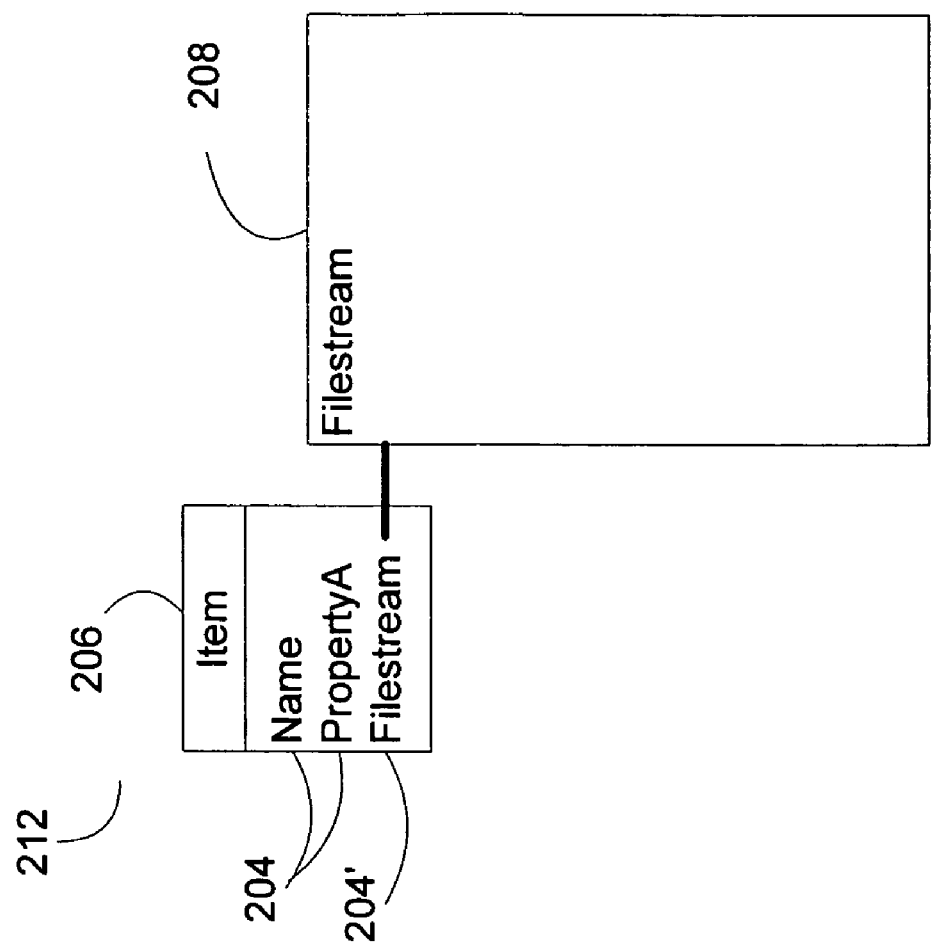
FIG. 2B is a block diagram illustrating an mixed element (ME) comprising both a structured data component and an unstructured filestream.
Figure 2A:
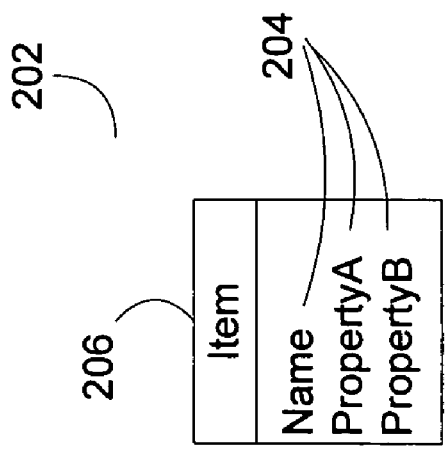
FIG. 2A is a block diagram illustrating a structured element (SE) having a plurality of properties.

For certain hardware/software interface systems, including the one described in the Foundational Patent Applications, certain of the autonomous units of storable information (e.g., an Item) may be of two kinds: structured or mixed. A structured element (SE) solely comprises richly-structured data, whereas a mixed element (ME) comprises both richly-structure data and an unstructured filestream. FIG. 2A is a block diagram illustrating an SE 202 having a plurality of properties 204. The SE is solely comprised of structured data and thus comprises a structure data component 206. FIG. 2B is a block diagram illustrating an ME 212 having a plurality of properties 204, one of which is the link 204' to the ME's filestream 208. The structured data component 206 of an ME 212 is distinguishable from the unstructured filestream 208 which represents the unstructured data component of an ME. With regard to synchronization, an SE meets certain size restrictions and is easily synchronized because it is small enough to create copies as needed. However, an ME is typically used for data structures that exceed the normal limits for Items and, because of their size, cannot be so easily copied, synchronized, and so forth for reasons readily apparent to skilled artisans.

For certain hardware/software interface systems, including the one described in the Foundational Patent Applications, synchronization of Items is typically performed at a transaction isolation level (TIL) that prevents the target Item while from being changed during synchronization but, instead, provides a copy to other processes that want to change the target Item and then updates the target Item with this copy once the target Item has completed its synchronization. This snapshot TIL (STIL) essentially allows the synchronization system to create a copy ("snapshot") of the target Item on an as needed basis for modification by other processes so that the target Item itself is not changed while being copied to a synchronization peer during synchronization of said target Item.

FIG. 3 is a process flow diagram illustrating the method used in conjunction with several embodiments of the present invention to synchronize an SE (and, as discussed later herein, the structure portion of an ME). In the figure, the first step 302 is to "snapshot" the change unit (in this case, the target Item) so that a copy of the change unit is made if any other process tries to make changes to this change unit at any time while copying of said change unit to a synchronization peer is being completed at step 304. Once copying is complete, the copy of the target Item is then used to update (e.g., replaces) the target Item at step 306.

Synchronizing without Snapshots

While SEs can be synchronized using snapshot TIL, it is often the case that snapshots are not made for an ME's filestream for several reasons, the most evident of which is the size of the filestream itself and a undesirability of creating a temporary copy of very large data objects.

Various embodiments of the present invention are directed to systems and methods for synchronizing MEs (and, specifically, for synchronizing the filestream component of MEs) between peer computer systems in a hardware/software interface system environment that does not permit snapshotting of large unstructured ME filestreams during synchronization. For several such embodiments, the method comprises synchronizing the ME in two steps, one for snapshotting the structured data component of the ME (as well as the cv of the filestream but not the filestream itself) and one for locking and transmitting the filestream to the receiving sync peer if and only if, after being locked, it is determined that the filestream is unchanged from the time of the ME data component snapshot.

FIG. 4 is a process flow diagram illustrating the steps of the method for synchronizing an ME. At step 402, and to begin the synchronization of a specific change unit (an ME Item), the structured data component (SDC) of the ME is snapshotted using the snapshot TLI (i.e., changes are made to a copy and not to the target item during synchronization, and then changes are applied after synchronization is complete) and, at step 404, the corresponding filestreams current version (cvF) at the time this snapshot is taken (e.g., the cvF value may be taken directly from the Filestream property in the snapshot of the ME structured data) is stored as a first value (cvF0). (The filestream of an ME comprises its own change unit and thus has its own change version, and this value may also be stored as part of the Filestream property in the structured data portion of the ME). Then, at step 406, the filestream is locked and, at step 408, the cvF is again checked to determine a second value (cvF1) which, at step 410, is compare against the first value (cvF0) and, if the values are the same (i.e., if cvF1 is not greater than cvF0, thereby indicating that the filestream is unchanged), the filestream is copied to the sync peer at step 412 and, once complete, the filestream is unlocked at step 416. On the other hand, if cvF1 is not the same as cvF0 (i.e., if cvF1 is greater than cvF0), then this indicates that the filestream has been updated since the ME's structure data was snapshotted, in which case the filestream is not copied and the change unit for the filestream reflects an "exception" to the synchronization at step 414—that is, that a failure to synchronize occurred and which is noted by the receiving sync peer and, in due course, leads to a subsequent attempt to synchronize the ME during the next synchronization operation between the two peers—and again the filestream is unlocked at step 416.

In addition to the foregoing, and referring again to FIG. 4, if a lock on the filestream cannot be obtained at step 406, then an exception at step 414 would again occur, but no unlock would be necessary at step 416. (This lock-fail exception path is not shown in the figure.) It should also be noted that a lock may be obtained through a series of standard function call such as, for example, a transactional read operation that inherently locks the target of the read.

In regard to the larger synchronization picture, and utilizing certain of the embodiments described herein, a synchronization algorithm employing this method would proceed as follows: The synchronization system would first use its normal change enumeration process to identify which Items (that is, change units) in the Sync replica have changed. This change enumeration also reads the change version of the filestream if the Item is an ME in conjunction with snapshotting the SDC (but not the filestream). Then, for MEs, the synchronization system locks the file stream at some point after stepping out of the snapshot transaction and reads the change version of the filestream once the lock is obtained. If the change version of the file stream has not changed from when the snapshot of the SDC was taken, then it is safe for the synchronization system to proceed with reading the contents of the file stream over to the sync peer since the filestream cannot be modified as it is being read/copied since it is locked. On the other hand, if the second reading of the filestream's cv fetches a new change unit version for the stream, then this indicates that the file stream was modified in between the time the process stepped out of the snapshot transaction and locked the file stream. In such a case, we create an "exception" that indicates to the sync partner that this element was not synced but need to be synced in a subsequent synchronization operation—that is, the filestream is not sent in this particular Synchronization pass, but enough information is maintained about the fact that it was not sent that, during a subsequent synchronization process, another attempt will be made to sync this ME.

Conclusion

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A method for synchronizing a mixed element between peer computer systems in a hardware software interface system, said method comprising:
    identifying a mixed element on a first peer computer system, wherein the mixed element comprises a structured data component and an unstructured filestream, wherein the hardware software interface permits snapshotting of the structured data component and does not permit the snapshotting of the unstructured filestream;
    snapshotting the structured data component, wherein the snapshotting structured data component comprises i) copying the structured data component to a copy structured data component such that for a duration associated with synchronization of the mixed element, changes associated with target structured data component are made to the copy structured data component, ii) preventing changes to said structured data component while it is being copied to a synchronization peer iii) making a first copy of said structured data component for a process that would make changes to said structured data during said copying of said structured data to a synchronization peer, and enabling said process to make changes to said first copy instead of to said structured data and iv) updating said structured data with said first copy once said structured data component is copied to said synchronization peer;
    determining a first change value associated with the filestream contemporaneously with the snapshotting;
    determining based on a change value of the structured data component and the first change value of the filestream whether the mixed element is to be copied to a second peer computer;
    locking the unstructured filestream to prepare it for copying to the second peer computer; wherein the locking is associated with a second change value of the filestream;
    comparing the first change value of the file stream to the second change value of the file stream to determine whether determining if the unstructured filestream was unchanged changed during the time between when the structured data component was snapshotted and when the unstructured filestream was locked; and
    copying the unstructured filestream to the second peer computer based on condition that the unstructured filestream was unchanged during the time between when the structured data component was snapshotted and when the unstructured filestream was locked.

2. The method of claim 1 flirt her comprising:
    if the unstructured filestream did change during the time between when the structured data component was snapshotted and the unstructured filestream was locked, then raising an exception to a synchronization peer and unlocking said unstructured filestream.

3. The method of claim 1 wherein step of locking said unstructured filestream is achieved by a transactional read operation.

4. The method of claim 1 wherein, if said unstructured filestream cannot be locked during the element of locking the unstructured filestream, then raising an exception to a synchronization peer and not performing the elements of (a) determining a second change value of said unstructured filestream after it is locked; and (b) if the second change value compared to the first change value indicates that no changes to the unstructured filestream occurred between the time the structured data component was snapshotted and the unstructured filestream was locked, then copying said unstructured filestream to the synchronization peer and, once completed, unlocking said unstructured filestream.

5. The method of claim 1 implemented by a hardware control device, said hardware control device comprising means for implementing each element of said method.

6. A computer-readable storage medium for synchronizing a mixed element between peer computer systems in a hardware software interface system, said computer-readable storage medium having stored thereon computer executable instructions that when executed by at least a processor perform the method comprising:
    identifying a mixed element on a first peer computer system, wherein the mixed element comprises a structured data component and an unstructured filestream, wherein the hardware software interface permits snapshotting of the structured data component and does not permit the snapshotting of the unstructured filestream;
    snapshotting the structured data component, wherein the snapshotting structured data component comprises i) copying the structured data component to a copy structured data component such that for a duration associated with synchronization of the mixed element, changes associated with target structured data component are made to the copy structured data component, ii) preventing changes to said structured data component while it is being copied to a synchronization peer iii) making a first copy of said structured data component for a process that would make changes to said structured data during said copying of said structured data to a synchronization peer, and enabling said process to make changes to said first copy instead of to said structured data and iv) updating said structured data with said first copy once said structured data component is copied to said synchronization peer;
    determining a first change value associated with the filestream contemporaneously with the snapshotting;
    determining based on a change value of the structured data component and the first change value of the filestream whether the mixed element is to be copied to a second peer computer;
    locking the unstructured filestream to prepare it for copying to the second peer computer; wherein the locking is associated with a second change value of the filestream;
    comparing the first change value of the file stream to the second change value of the file stream to determine whether determining if the unstructured filestream was unchanged changed during the time between when the structured data component was snapshotted and when the unstructured filestream was locked; and
    copying the unstructured filestream to the second peer computer based on condition that the unstructured filestream was unchanged during the time between when the structured data component was snapshotted and when the unstructured filestream was locked.

7. The computer-readable storage medium of claim 6 further including computer executable instructions to perform the method further comprising:
    if the unstructured filestream did change during the time between when the structured data component was snapshotted and the unstructured filestream was locked, then raising an exception to a synchronization peer and unlocking said unstructured filestream.

8. The computer-readable storage medium of claim 6 further comprising computer executable instructions whereby step of locking said unstructured filestream is achieved by a transactional read operation.

9. The computer-readable storage medium of claim 6 further comprising computer executable instructions whereby, if said unstructured filestream cannot be locked during the element of locking the unstructured filestream, then raising an exception to a synchronization peer and not performing the elements of (a) determining a second change value of said unstructured filestream after it is locked; and (b) if the second change value compared to the first change value indicates that no changes to the unstructured filestream occurred between the time the structured data component was snapshotted and the unstructured filestream was locked, then copying said unstructured filestream to the synchronization peer and, once completed, unlocking said unstructured filestream.

10. A system for synchronizing a mixed element between peer computer systems in a hardware software interface system, said system for synchronizing comprising at least one subsystem for:
    identifying a mixed element on a first peer computer system, wherein the mixed element comprises a structured data component and an unstructured filestream, wherein the hardware software interface permits snapshotting of the structured data component and does not permit the snapshotting of the unstructured filestream;
    snapshotting the structured data component, wherein the snapshotting structured data component comprises i) copying the structured data component to a copy structured data component such that for a duration associated with synchronization of the mixed element, changes associated with target structured data component are made to the copy structured data component, ii) preventing changes to said structured data component while it is being copied to a synchronization peer iii) making a first copy of said structured data component for a process that would make changes to said structured data during said copying of said structured data to a synchronization peer, and enabling said process to make changes to said first copy instead of to said structured data and iv) updating said structured data with said first copy once said structured data component is copied to said synchronization peer;
    determining a first change value associated with the filestream contemporaneously with the snapshotting;
    determining based on a change value of the structured data component and the first change value of the filestream whether the mixed element is to be copied to a second peer computer;
    locking the unstructured filestream to prepare it for copying to the second peer computer; wherein the locking is associated with a second change value of the filestream;
    comparing the first change value of the file stream to the second change value of the file stream to determine whether determining if the unstructured filestream was unchanged changed during the time between when the structured data component was snapshotted and when the unstructured filestream was locked; and
    copying the unstructured filestream to the second peer computer based on condition that the unstructured filestream was unchanged during the time between when the structured data component was snapshotted and when the unstructured filestream was locked.

11. The system of claim 10 further comprising at least one subsystem for:
    if the unstructured filestream did change during the time between when the structured data component was snapshotted and the unstructured filestream was locked, then raising an exception to a synchronization peer and unlocking said unstructured filestream.

12. The system of claim 10 further comprising at least one subsystem whereby said step of locking said unstructured filestream is achieved by a transactional read operation.

13. The system of claim 10 further comprising at least one subsystem whereby, if said unstructured filestream cannot be locked during the element of locking the unstructured filestream, then raising an exception to a synchronization peer and not performing the elements of (a) determining a second change value of said unstructured filestream after it is locked; and (b) if the second change value compared to the first change value indicates that no changes to the unstructured filestream occurred between the time the structured data component was snapshotted and the unstructured filestream was locked, then copying said unstructured filestream to the synchronization peer and, once completed, unlocking said unstructured filestream.

* * * * *

UNITED STATES PATENT AND TRADEMARK OFFICE
CERTIFICATE OF CORRECTION

| | | |
|---|---|---|
| PATENT NO. | : 7,457,826 B2 | Page 1 of 1 |
| APPLICATION NO. | : 11/025165 | |
| DATED | : November 25, 2008 | |
| INVENTOR(S) | : Irena Hudis et al. | |

It is certified that error appears in the above-identified patent and that said Letters Patent is hereby corrected as shown below:

In column 10, line 49, in Claim 2, delete "flirt her" and insert -- further --, therefor.

Signed and Sealed this
Twenty-sixth Day of April, 2011

David J. Kappos
*Director of the United States Patent and Trademark Office*